United States Patent
Jüstel et al.

(12)

(10) Patent No.: US 6,426,589 B1
(45) Date of Patent: Jul. 30, 2002

(54) LUMINESCENT MATERIAL COATED WITH A PROTECTIVE LAYER

(75) Inventors: Thomas Jüstel; Hans Nikol, both of Aachen; Walter Mayr, Würselen; Cornelis R. Ronda, Aachen, all of (DE)

(73) Assignee: Koninklijke Philips Electronics N.V., New York, NY (US)

( * ) Notice: Subject to any disclaimer, the term of this patent is extended or adjusted under 35 U.S.C. 154(b) by 0 days.

(21) Appl. No.: 09/383,292

(22) Filed: Aug. 25, 1999

(30) Foreign Application Priority Data

Aug. 25, 1998 (EP) .............................. 98202849

(51) Int. Cl.⁷ ................................ H01J 63/04
(52) U.S. Cl. ................ 313/484; 313/486; 252/301.4 R; 252/301.4 F
(58) Field of Search ................................ 313/484, 485, 313/486, 487, 489, 483; 252/301.4 R, 301.4 F, 301.4 H, 301.6 F, 301.6 R, 301.4 P

(56) References Cited

U.S. PATENT DOCUMENTS

| 3,599,028 A | * | 8/1971 | Wanmaker et al. | ......... 313/485 |
| 5,604,396 A | * | 2/1997 | Watanabe et al. | ........... 313/485 |
| 5,739,632 A |   | 4/1998 | Haase et al. | ................. 313/467 |
| 5,998,047 A |   | 12/1999 | Bechtel et al. | .............. 428/690 |

FOREIGN PATENT DOCUMENTS

| EP | 0476207 | 12/1990 | ............ C09K/11/66 |
| EP | 0887397 | 12/1998 | ............ C09K/11/02 |

* cited by examiner

*Primary Examiner*—Vip Patel
*Assistant Examiner*—Joseph Williams
(74) *Attorney, Agent, or Firm*—Frank Keegan

(57) ABSTRACT

A luminescent material is dispersed in a watery solution of sodium polyphosphate, a watery solution of a nitrate of the metal M is added, after which the luminescent material is separated, dried and fired. The metal is chosen from the group consisting of Ca, Sr, and Ba, whereby a protective layer of metal polyphosphate is formed on the luminescent material.

5 Claims, No Drawings

LUMINESCENT MATERIAL COATED WITH A PROTECTIVE LAYER

BACKGROUND OF THE INVENTION

The invention relates to a method of coating a luminescent material with a protective layer.

The invention also relates to a luminescent material coated with a protective layer and to a discharge lamp equipped with a luminescent screen comprising such a luminescent material.

A method as mentioned in the opening paragraph is known from EP 0476207 A2. This document describes the coating of a silicate phosphor making use of chemical vapour deposition. Coated luminescent materials show a relatively high stability in the watery slurry that is used in a lamp manufacturing process and an improved maintenance of the light output, when used for instance in the luminescent screen of a low pressure mercury discharge lamp. A drawback of chemical vapour deposition is that the equipment is very expensive. Alternatively coatings can be applied to luminescent materials by means of homogeneous precipitation from a watery solution. Such a process is described for instance in WO 96/05265 and is mainly used to apply metal oxide layers wherein the metal is chosen from the group Y and Al. This latter process is far cheaper than chemical vapour deposition but needs to be carried out at a relatively low pH to prevent the precipitation of large quantities of metal hydroxide. However, many luminescent materials (for instance materials having a silicate host lattice) are sensitive towards hydrolysis at the relatively low pH values at which the homogeneous precipitation is taking place. Additionally it has been found that the optical properties such as reflectivity and quantum efficiency of other luminescent materials that do not or hardly hydrolize in water are adversely affected by a low pH value.

SUMMARY OF THE INVENTION

The invention has for its object to coat a luminescent material by means of homogeneous precipitation from a watery solution in which hydrolysis of the luminescent material and degradation of its optical properties are to a large extent prevented.

According to the invention, the luminescent material is dispersed in a watery solution of water soluble polyphosphate, a watery solution of a water soluble salt of a metal M chosen from the group formed by Ca, Sr and Ba is added to the dispersion after which the luminescent material is separated from the watery dispersion and is dried and heated.

The product is a luminescent material coated with a protective layer, which comprises a polyphosphate of general formula $(M_{0.5}PO_3)_n$ in which metal M is chosen from the group formed by Ca, Sr and Ba.

It has been found that the precipitation of a polyphosphate of a metal M chosen from the group formed by Ca, Sr and Ba using a method according to the invention can very well be carried out at a relatively high value of the pH. As a consequence hydrolysis and degradation of the luminescent material are strongly suppressed.

Good results have been obtained with a method according to the invention, wherein the water soluble polyphosphate is sodium polyphosphate and/or wherein the water soluble salt of the metal M is a nitrate.

Preferably the pH of the watery solution of water soluble polyphosphate is adjusted to be in the range 8–10 before the luminescent material is dispersed in it. It was found that both hydrolysis and degradation of the luminescent material were effectively suppressed.

To effect a dense coating with a thin layer of polyphosphate on the surface of the particles of luminescent material, the dispersion is preferably treated with ultrasonic waves to desagglomerate the luminescent material before the watery solution of the water soluble salt of the metal M is added.

The method was found to be very suitable for coating luminescent materials comprising a silicate host lattice. Good results have been obtained for $BaSi_2O_5$ activated with lead and $(Ba, Sr)_2MgSi_2O_7$ activated with lead. More in particular in case M was chosen as Ca.

A luminescent material coated by means of a method according to the invention was found to be very suitable to be used in a discharge lamp, more in particular a low pressure mercury discharge lamp.

DETAILED DESCRIPTION OF THE PREFERRED EMBODIMENTS

In the first embodiment $BaSi_2O_5$ with lead (BSP) is coated with calciumpolyphosphate.

2.45 gram of sodiumpolyphosphate is dissolved in 150 ml water. After filtration of the solution 1000 ml water is added. The pH is adjusted to pH 8.7 by adding $NH_3$ and 100 gram of BSP is is dispersed in the solution. The suspension is treated with ultrasonic waves for two minutes. A solution is prepared of 4.25 gram $Ca(NO_3)_2$ in 180 ml water. 20 ml of 1M $NH_3$ is added to this solution. The solution is then added to the phosphor suspension dropwise within 15 minutes. The coated phosphor is separated by vacuum filtration and washed two times by dispersion in 400 ml water and subsequent vacuum filtration. The clean product is dried at 100 C. for 2 hours. Finally, the coated phosphor is fired at 400 C. for 1 hour. The emission spectrum of coated BSP was substantially identical to that of uncoated BSP ($\lambda$max=351 nm; FWHM=38 nm for coated BSP and $\lambda$max=350 nm; FWHM=38 nm for uncoated BSP). Also the reflection coefficients for 254 nm and 350 nm radiation were almost identical (20% and 96% for uncoated BSP and 20% and 98% for coated BSP respectively). Surprisingly, however, the quantum efficiency for 254 nm radiation of the coated BSP was found to be 3% higher than that of uncoated BSP (91% and 88% respectively).

In a second embodiment $BaSi_2O_5$ activated with lead (BSP) is coated with bariumpolyphosphate.

1.02 gram of sodiumpolyphosphate is dissolved in 100 ml water. After filtration of the solution 600 ml water is added. The pH is adjusted to pH 9.2 by adding $NH_3$ and 50 gram of BSP is dispersed in that solution. The suspension is treated with ultrasonic waves for two minutes. A solution is prepared of 1.96 gram $Ba(NO_3)_2$ in 180 ml water. 20 ml of 1M $NH_3$ is added to this solution. The solution is then added to the phosphor suspension dropwise within 15 minutes. The coated phosphor is separated by vacuum filtration and washed two times by dispersion in 200 ml water and subsequent vacuum filtration. The clean product is dried at 100 C. for 2 hours. Finally, the coated phosphor is fired at 600 C. for 2 hours. The emission spectra of coated and uncoated BSP are substantially identical ($\lambda$max=350 nm; FWHM=38 nm). The quantum efficiency for 254 nm radiation of coated and uncoated BSP was found to be 93% and 88% respectively. The reflection coefficients for 254 nm and 350 nm radiation were 20% and 96% for uncoated BSP and 20% and 97% for coated BSP respectively.

In a third embodiment $Sr_2MgSi_2O_7$ activated with lead (SMS) is coated with calciumpolyphosphate.

0.51 gram of sodiumpolyphosphate is dissolved in 50 ml water. After filtration of the solution 600 ml water is added. The pH is adjusted to a value of 9.4 by adding $NH_3$ and 25 gram of SMS is dispersed in that solution. The suspension is treated with ultrasonic waves for two minutes. A solution is prepared of 0.885 gram $Ca(NO_3)_2$ in 180 ml water. 20 ml of 1M $NH_3$ is added to this solution. The solution is then added to the phosphor suspension dropwise within 15 minutes. The coated phosphor is separated by vacuum filtration and washed two times by dispersion in 200 ml water and subsequent vacuum filtration. The clean product is dried at 100 C. for 2 hours. Finally, the coated phosphor is fired at 600 C. for 1 hour. The emission spectra of coated and uncoated SMS are very similar ($\lambda$max=360 nm; FWHM=60 nm for uncoated SMS and $\lambda$max=358 nm; FWHM=64 nm for coated SMS). The quantum efficiency of coated and uncoated SMS was found to be 76%. The reflection coefficients for 254 nm radiation were 11% and 10% for uncoated SMS and for coated SMS respectively. The reflection coefficients for 360 nm radiation were 97% and 90% for uncoated SMS and for coated SMS respectively.

What is claimed is:

1. Luminescent material comprising a phosphor, said phosphor being coated with a protective layer which comprises a polyphosphate of general formula $(M_{0.5}PO_3)_n$ in which metal M is chosen from the group consisting of calcium, strontium and barium, said phosphor being configured to have a quantum efficiency for light of 254 nm wavelength which equals or exceeds the quantum efficiency of said phosphor without the protective layer.

2. Luminescent material according to claim 1, comprising a silicate host lattice.

3. Luminescent material according to claim 2, comprising $BaSi_2O_5$ activated with lead.

4. Luminescent material according to claim 2, comprising $(Ba,Sr)_2MgSi_2O_7$ activated with lead.

5. A discharge lamp comprising a luminescent screen, said screen supporting a luminescent material, said discharge lamp being a low pressure mercury discharge lamp, said luminescent material being coated with a protective layer which comprises a polyphosphate of general formula $(M_{0.5}PO_3)_n$ in which metal M is chosen from the group consisting of calcium, strontium and barium, and said luminescent material being configured to have a quantum efficiency for light of 254 nm wavelength which equals or exceeds the quantum efficiency of said luminescent material without the protective layer.

* * * * *